J. ZANDER.
AUTOMATIC CHECK VALVE FOR GAS.
APPLICATION FILED MAR. 15, 1913.

1,067,633.

Patented July 15, 1913.

3 SHEETS—SHEET 1.

Witnesses:
Harry S. Gaither
Wm. P. Bond

Inventor:
John Zander
by Banning & Banning
Attys

J. ZANDER.
AUTOMATIC CHECK VALVE FOR GAS.
APPLICATION FILED MAR. 15, 1913.
1,067,633.
Patented July 15, 1913.
3 SHEETS—SHEET 2.
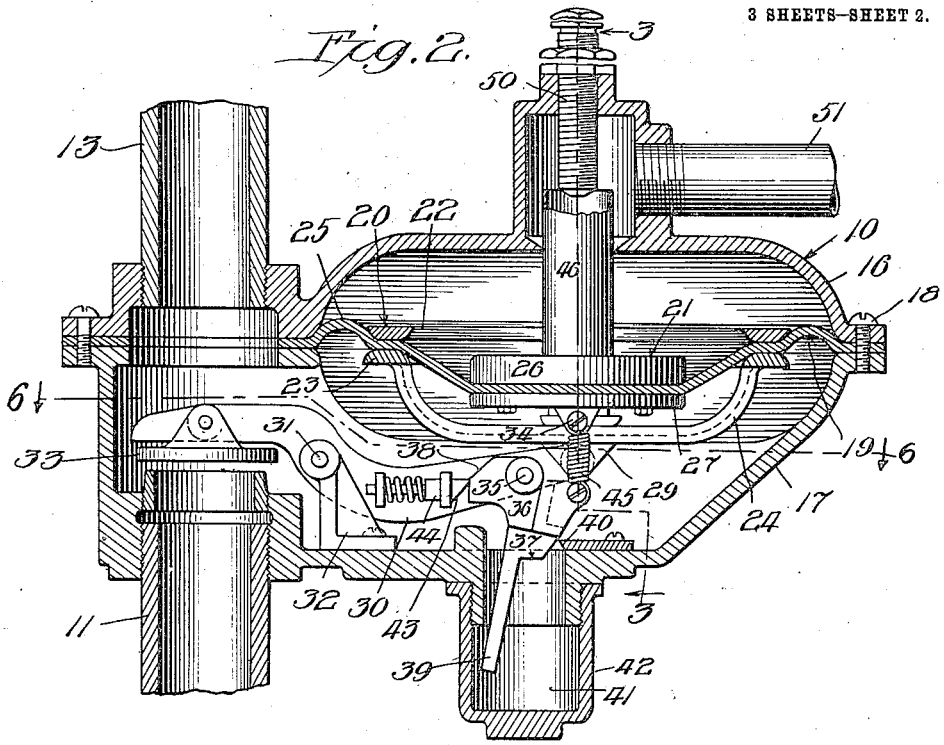
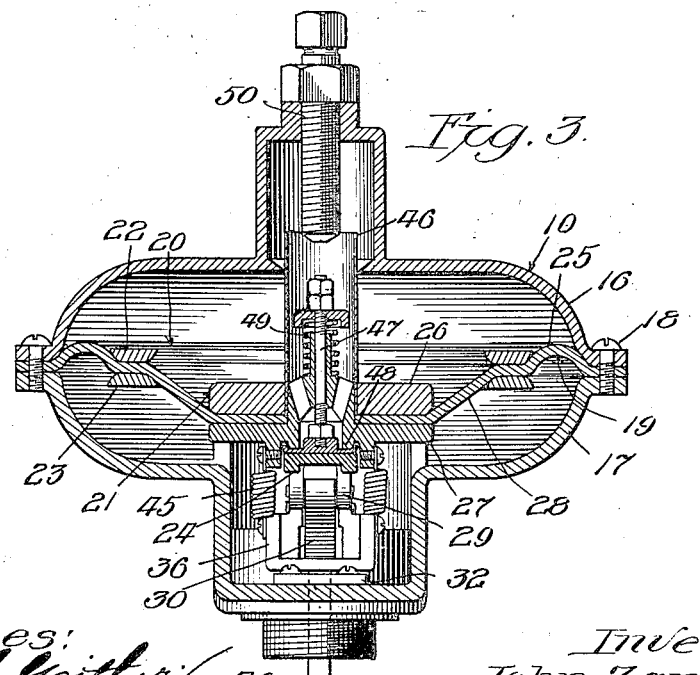
Witnesses:
Harry S. Gaither
Wm. P. Bond
Inventor:
John Zander
by Banning & Banning
Attys

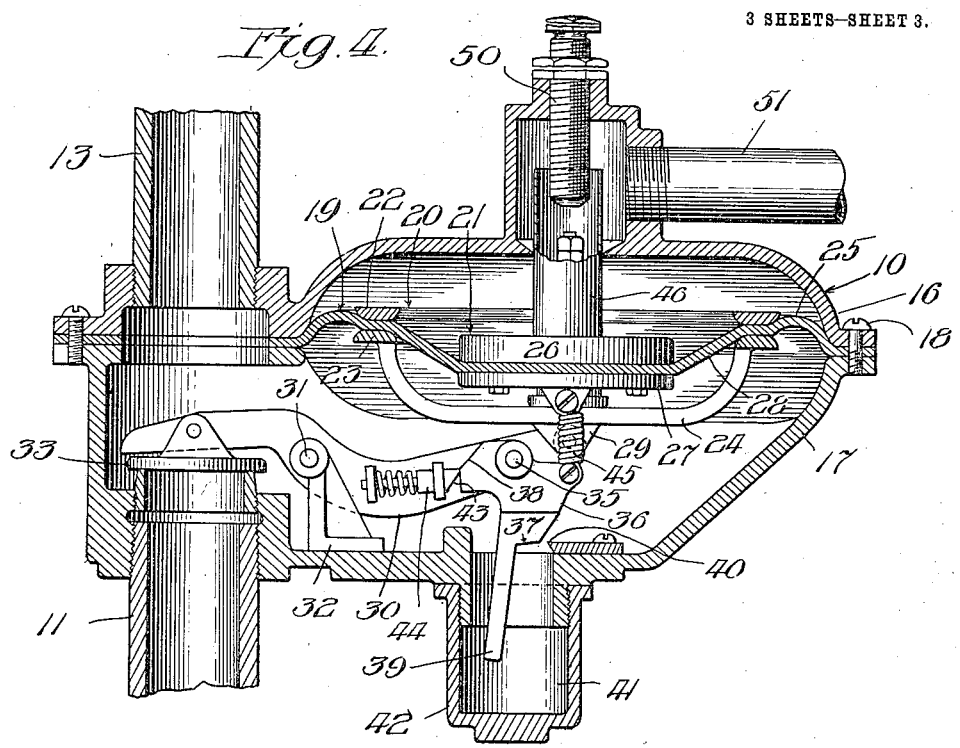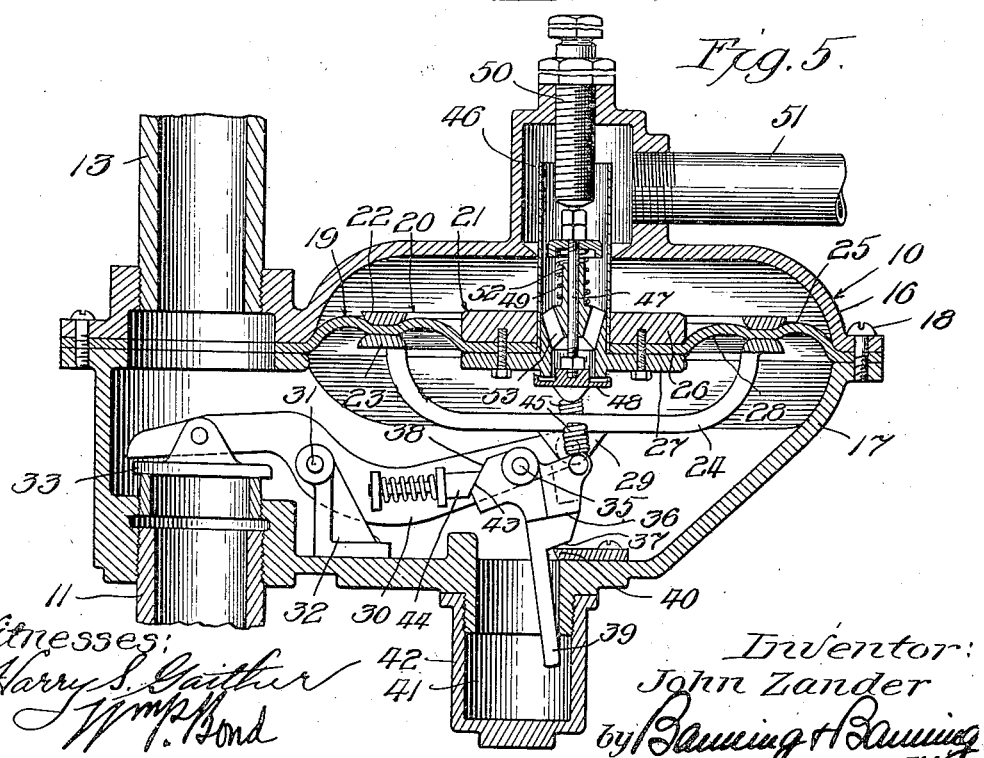

UNITED STATES PATENT OFFICE.

JOHN ZANDER, OF CHICAGO, ILLINOIS.

AUTOMATIC CHECK-VALVE FOR GAS.

1,067,633.　　　　　　Specification of Letters Patent.　　Patented July 15, 1913.

Application filed March 15, 1913. Serial No. 754,517.

*To all whom it may concern:*

Be it known that I, JOHN ZANDER, a citizen of the United States, residing at Chicago, in the county of Cook and State of Illinois, have invented certain new and useful Improvements in Automatic Check-Valves for Gas, of which the following is a specification.

The present invention relates more particularly to a device adapted and intended to cut off the flow of gas between the street main and the building when an excess of pressure shall occur, either by reason of abnormal pressure in the gas itself, or a back pressure created by an obstruction in the piping.

The objects of the present invention are to provide a single mechanism which will be actuated by abnormal pressure from any cause whatsoever; to provide means whereby, should said pressure be intensified or continue to accumulate after the valve controlling the flow from the street main has been actuated, the valve will be locked in closed position, and the locking mechanism is so arranged that it cannot be moved from locked position save by manual manipulation; to utilize a single diaphragm which will have secured thereto a set of outer members and a set of inner members, thus dividing the diaphragm surface in such a manner as to produce two diaphragms, one of which having a somewhat greater exposed area than the other; to actuate the valve through the instrumentalities of one of the diaphragms and to actuate the locking mechanism for the valve by the other of said diaphragms; to arrange a resilient connection between said locking mechanism and diaphragm, or other means for operating the same, thus permitting said diaphragm to fall without forcing the locking member out of locked position, or causing an undue strain thereon; to provide means for venting the pressure from beneath the diaphragms after said pressure has reached a predetermined degree; and to provide adjustable means for actuating said venting means, whereby it may vent at any pressure desired.

The invention further consists in the features of construction and combination of parts hereinafter described and claimed.

Figure 1:
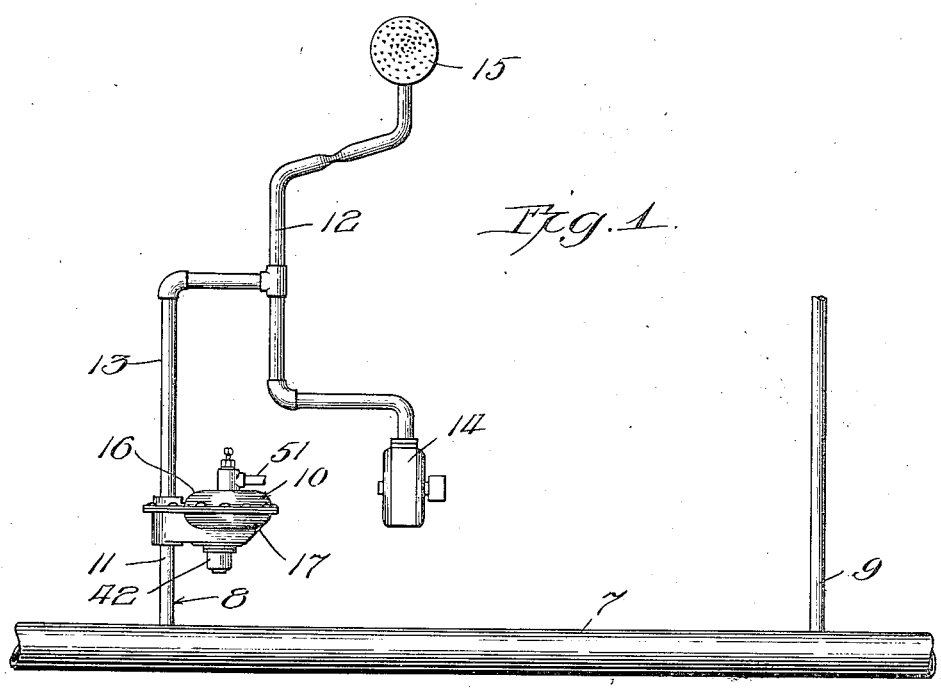
Figure 6:
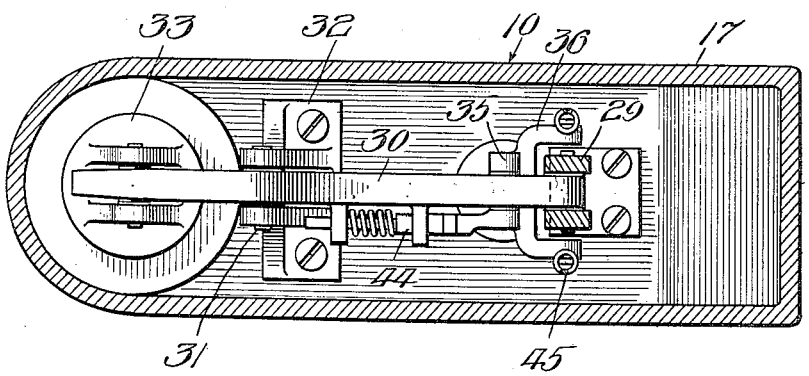

In the drawings: Figure 1 is a diagrammatic view showing the device of the present invention positioned in a system of piping; Fig. 2 a longitudinal section of the device of the present invention showing the valve for controlling the inlet into the casing in open position; Fig. 3 a vertical section on line 3—3 of Fig. 2 looking in the direction of the arrow, showing the cup-shaped member or closure which houses the lower end of the catch member removed. Fig. 4 a view similar to Fig. 2 showing the valve for controlling the inlet moved to closed position; Fig. 5 a view similar to Fig. 4 showing the locking mechanism moved to locked position; and Fig. 6 a section on line 6—6 of Fig. 2 looking in the direction of the arrow.

As heretofore stated, the device of the present invention is intended and more particularly adapted for use upon gas systems for checking the flow of gas, either from the building to the street, or from the street to the building, when an excess of pressure shall be produced. It is principally used in connection with the supplying of gas for industrial purposes, as, for instance, in connection with furnaces for treating metal and like substances. In that particular field, difficulty has been experienced in cases where the piping within the building becomes jammed or mutilated in such a way as to restrict the area of the passage at the point of mutilation. This is very apt to occur where gas is used for industrial purposes, owing to the carelessness of workmen in throwing heavy objects about the room, and owing to the melting of the brick about the furnaces. In either of the two cases cited above, or from any other cause, the piping within the building is liable to become mutilated; that is, a dent or bent is liable to be placed in a pipe through such accident. Such a bending or denting serves to restrict the flow of gas through the pipe. In systems of this nature a pressure apparatus is usually provided in the nature of a blower which increases pressure of the gas, this blower is usually located some place in the piping within the building, this blower or pressure mechanism will continue to operate after the restriction is placed in the pipe, thus there will be a back pressure created which will flow out into the street main and back into the building adjacent, with the result that the service in the adjacent building is killed.

In the present invention a regulating device is provided which, when said back pressure occurs, checks the flow of said pressure from the building to the street main; and hence the adjacent buildings are unaffected by the abnormal pressure created by the back flow. The service in the building, where such back pressure is created, is cut off and remains cut off until a workman is brought from the gas company to unlock the valve which checks the flow from the street main into the building, and thus the restriction in the piping and the source of the back pressure will be eliminated before the gas is again turned on in this particular building. In this manner the only ones affected by this creation of back pressure are the occupants of the particular building in which the pressure is created.

Referring now to the drawings and more particularly to Fig. 1, a street main is therein indicated at 7, and leading from said main are supply pipes 8 and 9 extending to adjacent buildings. Interposed in the supply pipe 8 is a casing 10 which houses the mechanism of the present invention. The portion of the piping 8 which extends from the street main to said casing may be said to constitute an inlet 11 to said casing, while that portion of the piping extending from the casing to the piping 12 within the building may be said to constitute the outlet pipe 13 from the casing, and the openings in the casing to which the pipes are attached may be termed the inlet and outlet openings respectively. The piping 12 is connected at one end to a suitable pressure-creating mechanism 14 and at its other end is connected to a burner or other device 15. The pressure-creating mechanism 14 may be of any suitable style and arrangement practical to the carrying out of its purpose and function which is to create oxygen and commingle it with the gas within the piping of the furnace, whereby the necessary mixture is created to supply heat suitable for the purpose of the consumer. The operating parts of the device of the present invention is illustrated more in detail in the remaining figures of the drawings.

Referring now to Fig. 2, it will be seen that the casing 10 is composed of an upper section 16 and a lower section 17 held together by suitable locking members 18. Interposed between the adjacent faces of the upper and lower sections is a diaphragm 19 of any suitable style and construction. The diaphragm in the construction shown is maintained in position through the medium of positioning members 18 of any suitable construction. The diaphragm has secured thereto what may be termed an outer set of members 20 and an inner set of members 21. The outer set consists in the construction shown of an upper ring-like member 22 and a lower ring-like member 23, which latter member has formed therewith a spider-like bar or web 24. As will be seen by referring to Fig. 3, this web or bar is considerably narrower than the distance between the inner edges of the ring 23, and this outer set of members is of open construction. That portion of the diaphragm between the outer set of members and the points where the diaphragm is held between the adjacent faces of the sections of the casing constitutes in fact an outer diaphragm section 25.

It is understood that the rings 22 and 23 are held together by any suitable and well known fastening means. The inner set of members 21 consists in the construction shown of an upper disk-like member 26, and a lower disk like member 27, which are secured together by any suitable fastening means. It will be noted that the inner and outer sets of members are spaced away from one another, so that an expanse of diaphragm surface is exposed between the same. This surface constitutes in fact an inner diaphragm section 28. The inner diaphragm section is preferably of a somewhat greater area than the outer diaphragm, so that pressure of a certain degree will affect the outer diaphragm before the inner diaphragm.

The web portion 24 has secured thereto companion lugs 29, as shown in Figs. 2 and 4. Pivotally secured to the lugs is one end of a lever 30 pivoted at 31 to a standard or support 32 attached to the casing; said lever carries at its other end a valve member 33 which is arranged to control the passage of gas through the pipe 8 into the casing. Pivotally secured to the lever 30 at 35 is what may be termed a catch member 36. The catch member is provided with a shoulder 37, a beveled or sloping face 38, and a stem or finger-piece 39. The shoulder 37 is intended to rest when the catch is thrown to locking position upon a surface or ledge 40, as will be best understood by referring to Fig. 5. The stem or finger-piece 39, as will be seen from Figs. 2, 4, or 5, extends into a well 41 which is formed in a cup-shaped member 42 which is screw-threaded or otherwise attached to the lower portion 17 of the casing, and the beveled surface 38 of the catch is adapted to be engaged by a beveled surface 43 of a spring-pressed latch member 44 which is carried by the lever 30. The catch member is connected to lugs or ears 34 on the member of the inner set of members 21 through the medium of coil springs 45.

The inner set of members 21 carries a sleeve or tube 46 and arranged within this sleeve or tube, as best shown in Fig. 5, is a sliding stem 47 carrying at its lower end a valve 48; said valve is normally maintained in closed position through the action of a spring 49. A threaded abutment 50 is provided which is entered into the upper portion of the diaphragm casing and which engages the stem 47 and acts to unseat the valve 48 when the diaphragm shall have moved sufficient to carry said stem into engagement with said abutment. A discharge pipe 51 is arranged in the upper portion of the casing, and a bearing 52 for the stem 47 is provided which has suitable openings or passages 53 therein.

The operation of the device is as follows: Suppose the parts are in the position shown in Fig. 2, which is their normal position and the position which they assume when gas is passing in the ordinary manner from the street main into the building, and suppose an excess pressure is created, either through an excess of pressure in the main, or through a back pressure created in the piping of the building, it being evident that said excess pressure will accumulate in the casing, whether it comes through the piping 13 or the piping 11, and after it has reached a predetermined degree, we will say, for purposes of illustration, 6 inches, the outer diaphragm 25 will rise carrying with it the outer members 20 and the inner members 21. The movement of the outer members will swing the lever 30 about the upper pivot 31 and lower the valves 33 into the position shown in Fig. 4, cutting off the supply of gas from the street main to the building. If the action of the diaphragm has been influenced by an excess of pressure in the street main, the flow of the abnormal pressure into the casing will be checked as soon as the valve 33 is seated, and when said abnormal pressure has been drawn out of the casing through the piping 13, the diaphragm 25 will lower, with the result that the valve 33 will be unseated and the parts returned to the position shown in Fig. 2. Thus an excess of pressure from the street main will not affect the mechanism of the present invention in a manner to permanently cut off the supply of gas from the street main to the building; but suppose the abnormal pressure within the casing is created by a back pressure from the building, that is, suppose the piping or the burners have become clogged, as shown in Fig. 1, and a restriction is thus placed in the passage through the piping, the pressure from the pressure-creating device 14 will flow back through the piping 13 and into the casing. After this pressure has reached 6 inches, it will lower the valve 33 in the manner previously described, and cut off the flow of gas from the street main to the building, but under these last named conditions the valve 33 will not check the flow of the abnormal pressure into the casing, since the pressure-generating device 14 will continue to actuate even after the valve 33 is seated; hence pressure will continue to be forced into the interior of the casing.

When said pressure has reached a degree of 7 inches the inner diaphragm 28 will become influenced, the outer diaphragm by this time having reached its limit of movement, and the inner set of members 21 will move upwardly and away from the outer members; and through the medium of the spring connection 45 the catch member 36 will be swung about its pivot until the shoulder 37 is brought above the ledge 40, as shown in Fig. 5, and when this position has been reached the beveled face 43 of the latch 44 will engage the beveled face 38 of the catch member and affect the locking of the latch member in position in the manner shown in Fig. 5. With the parts in this position, it is obvious that the lever 30 will be held locked through the instrumentalities of the catch and latch members, since the latch member is carried by the lever, and since the spring pressure on the latch member is sufficient to withstand the weight of the members connected to the diaphragm in case pressure from beneath the diaphragm should be relieved and they should descend, so that after the parts are once placed in this position, the valve 33 is locked in closed position, and the supply of gas from the street main to the building is cut off until the cap-piece 42 is removed from the casing and the catch swung back to normal position by manual manipulation of the finger-piece 39.

It would be obviously undesirable to allow pressure to accumulate within the chamber of the casing beyond the point which the diaphragm could stand without splitting and to avoid this the valve 48 is provided. By referring to Fig. 5 it will be seen that the pressure has forced the diaphragms upward until the upper end of the stem 47 has contacted the abutment 50. Any further movement of the diaphragm will result in the stem 47 being forced downward and unseating the valve 48, and the pressure will thus escape through the openings 53 and the interior of the sleeve 46, and will pass out through the discharge pipe 51. As an illustration, it may be assumed that the valve 48 will unseat when a pressure of 8 inches develops within the interior of the casing. This relieving of the pressure through the unseating of the valve 48 may cause the inner diaphragm and the inner set of members secured thereto to descend to a greater or less degree, and this is permitted without disturbing the position or placing a strain on the catch member 36, owing to the resilient connection between said catch member and said inner set of members. It is understood that such terms as "inner sets" and "outer sets" are only used for descriptive purposes, and the invention is not limited by the use of such terms in any other manner than may be set forth in the appended claims.

I claim:

1. In a device of the class described, the combination of a casing provided with an inlet passage and an outlet passage, a valve for controlling the inlet passage, means for actuating said valve influenced by an abnormal pressure entering the casing, and means for locking said valve in closed position influenced by a continued entrance of said abnormal pressure into said casing, substantially as described.

2. In a device of the class described, the combination of a casing provided with an inlet passage and an outlet passage, a valve for controlling the inlet passage, a shiftable member operated by the creation of abnormal pressure within said casing, an operative connection between said shiftable member and valve, a second shiftable member operated by a continued creation of abnormal pressure in said casing, means for locking said valve in closed position, and an operative connection between said second shiftable member and locking means, substantially as described.

3. In a device of the class described, the combination of a casing provided with an inlet passage and an outlet passage, a valve for controlling the inlet passage, a shiftable member operated by the creation of abnormal pressure within said casing, an operative connection between said shiftable member and valve, a second shiftable member operated by the continued creation of abnormal pressure in said casing, means for locking said valve in closed position, and an operative connection between said second shiftable member and locking means, said locking means being arranged to remain in locked position until released by manual application, substantially as described.

4. In a device of the class described, the combination of a casing provided with an inlet passage and an outlet passage, a valve for controlling the inlet passage, a shiftable member operated by the creation of abnormal pressure within said casing, an operative connection between said shiftable member and valve, a second shiftable member operated by the continued creation of abnormal pressure in said casing, means for locking said valve in closed position, an operative connection between said second shiftable member and locking means, said locking means being arranged to remain in locked position until released by manual application, and means for venting pressure from the interior of said casing after the pressure therein has reached a predetermined degree, substantially as described.

5. In a device of the class described, the combination of a casing provided with an inlet passage and an outlet passage, a valve for controlling the inlet passage, a pivoted lever to which said valve is attached, means for actuating said lever to move the valve to closed position upon the creation of abnormal pressure in said casing, and means for locking said lever to maintain the valve in closed position upon a further creation of abnormal pressure in said casing, substantially as described.

6. In a device of the class described, the combination of a casing provided with an inlet passage and an outlet passage, a valve for controlling the inlet passage, a pivoted lever to which said valve is attached, a shiftable member operated by the creation of abnormal pressure within the casing, an operative connection between said shiftable member and lever, a second shiftable member operated by a continued creation of abnormal pressure within the casing, means for locking said lever to maintain said valve in closed position, and an operative connection between said locking means and second shiftable member, substantially as described.

7. In a device of the class described, the combination of a casing provided with an inlet passage and an outlet passage, a valve for controlling the inlet passage, a pivoted lever to which said valve is attached, a shiftable member operated by the creation of abnormal pressure within the casing, an operative connection between said shiftable member and lever, a second shiftable member operated by a continued creation of abnormal pressure within the casing, means for locking said lever to maintain said valve in closed position, and an operative connection between said locking means and second shiftable member, said locking means being arranged to remain in locked position until released by manual application, substantially as described.

8. In a device of the class described, the combination of a casing provided with an inlet passage and an outlet passage, a valve for controlling the inlet passage, a pivoted lever to which said valve is attached, a shiftable member operated by the creation of abnormal pressure within the casing, an operative connection between said shiftable member and lever, a second shiftable member operated by a continued creation of abnormal pressure within the casing, means for locking said lever to maintain said valve in closed position, an operative connection between said locking means and second shiftable member, said locking means being arranged to remain in locked position until released by manual application, and means for venting pressure from the interior of said casing after the pressure therein has reached a predetermined degree, substantially as described.

9. In a device of the class described, the combination of a casing provided with an inlet passage and an outlet passage, a valve for controlling said inlet passage, means for moving said valve to closed position influenced by the creation of abnormal pressure within said casing, means for locking said valve in closed position, means for actuating said locking means influenced by a continued creation of abnormal pressure within said casing, said locking means being arranged to be released solely by manual application, said casing having a discharge passage therein, and a valve controlling communication to said discharge passage, said valve being opened when said abnormal pressure shall have reached a predetermined degree, substantially as described.

10. In a device of the class described, the combination of a casing provided with an inlet passage and an outlet passage, a valve for controlling said inlet passage, means for moving said valve to closed position influenced by the creation of abnormal pressure within said casing, means for locking said valve in closed position, means for actuating said locking means influenced by a continued creation of abnormal pressure within said casing, said locking means being arranged to be released solely by manual application, said casing having a discharge passage therein, a valve controlling communication to said discharge passage, and an adjustable abutment for engaging and unseating said valve, substantially as described.

11. In a device of the class described, the combination of a casing provided with an inlet passage and an outlet passage, a valve for controlling said inlet passage, a diaphragm within said casing, an outer set of members secured to said diaphragm, an inner set of members secured to said diaphragm, an expanse of diaphragm surface about each of said members, said outer set being of open formation to expose such expanse of surface to the action of pressure, a connection between said outer set of members and said valve, means for locking said valve in closed position, and a connection between said inner set of members and said locking means, substantially as described.

12. In a device of the class described, the combination of a casing provided with an inlet passage and an outlet passage, a valve for controlling said inlet passage, means actuated by the creation of abnormal pressure within the casing for moving said valve to closed position, means for locking the valve in closed position, means for operating said locking means actuated by the continued creation of abnormal pressure within said casing, and a resilient connection between said locking means and the actuating means therefor, substantially as described.

13. In a device of the class described, the combination of a casing provided with an inlet passage and an outlet passage, a valve for controlling said inlet passage, a pivoted lever to which said valve is connected, means influenced by the creation of abnormal pressure within the casing for moving said lever to place the valve in closed position, locking means for the lever carried by the lever, and means for moving said locking means to locked position influenced by a continued creation of abnormal pressure within the casing, substantially as described.

14. In a device of the class described, the combination of a casing provided with an inlet passage and an outlet passage, a valve for controlling said inlet passage, a pivoted lever to which said valve is connected, means influenced by the creation of abnormal pressure within the casing for moving said lever to place the valve in closed position, locking means for the lever carried by the lever, means for moving said locking means to locked position influenced by a continued creation of abnormal pressure within the casing, and a resilient connection between said locking means and the means for moving the same, substantially as described.

15. In a device of the class described, the combination of a casing provided with an inlet passage and an outlet passage, a valve for controlling said inlet passage, a pivoted lever to which said valve is connected, means influenced by the creation of abnormal pressure within the casing for moving said lever to place the valve in closed position, a pivoted catch on said lever, a seat for said catch, a spring pressed latch on said lever arranged to engage said catch when said catch is moved to seated position, and means for moving said catch influenced by the continued creation of an abnormal pressure within the casing, substantially as described.

JOHN ZANDER.

Witnesses:
EPHRAIM BANNING,
WM. P. BOND.